March 19, 1968
A. WESSTROM
3,373,627
ADJUSTABLE SYNCHRONIZATION GEARS FOR
SERPENTINE SLITTING MACHINE
Filed Jan. 27, 1966
3 Sheets-Sheet 1
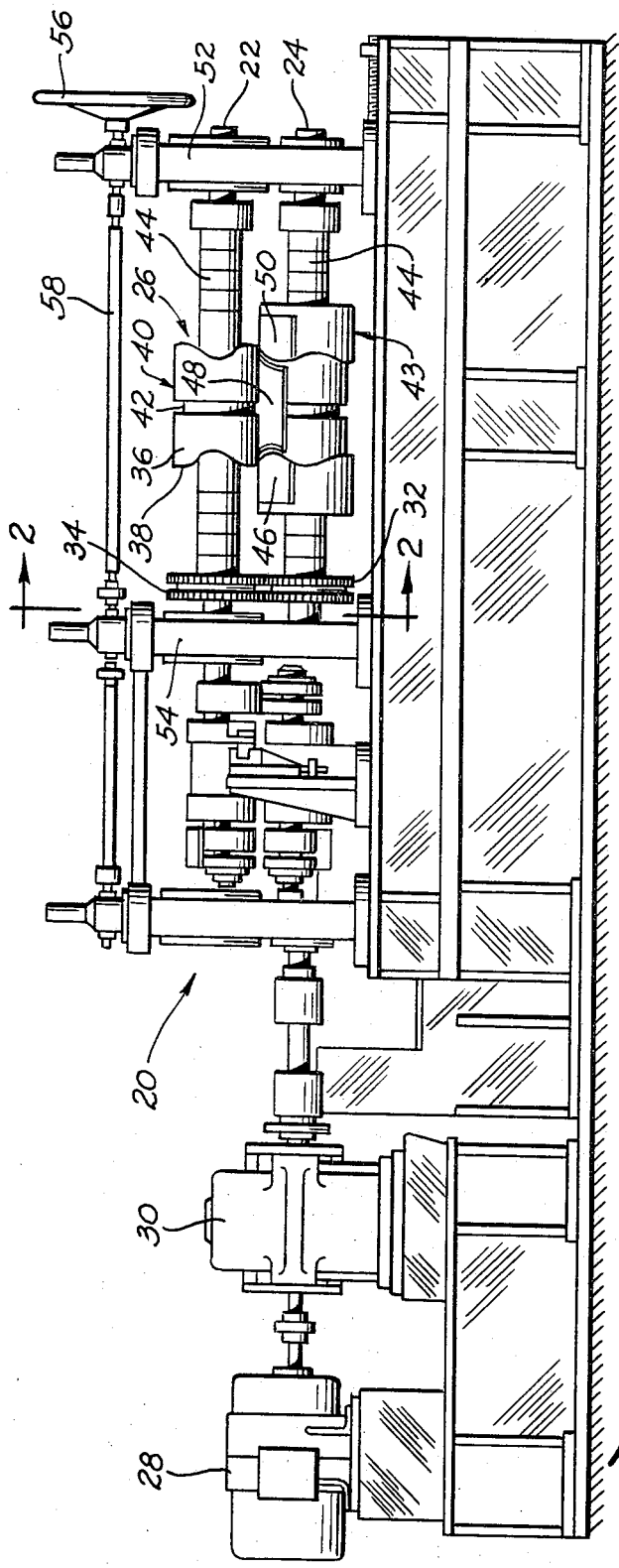
INVENTOR.
ALFRED WESSTROM.
BY
*Gordon N Cheney*
AGENT.

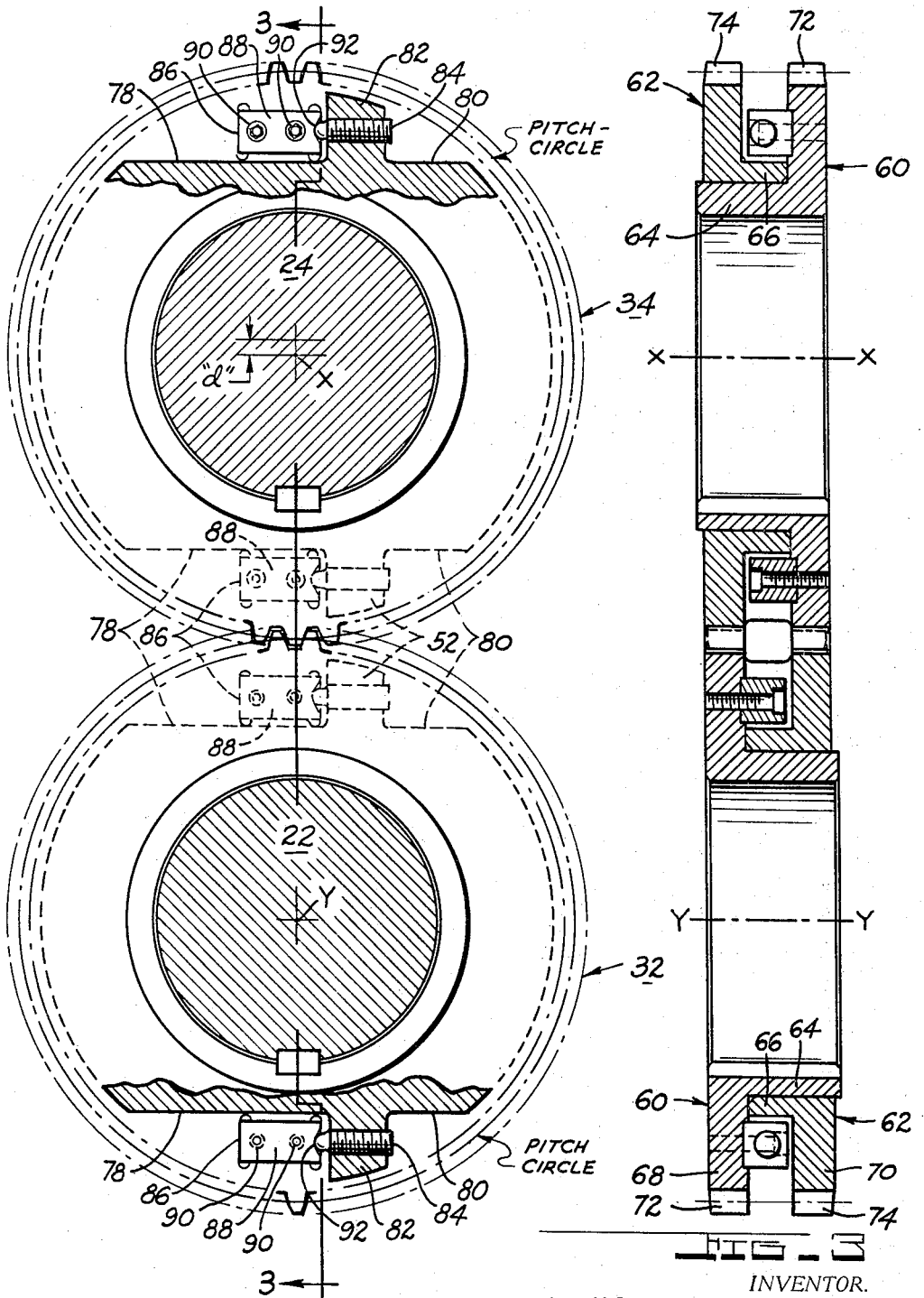

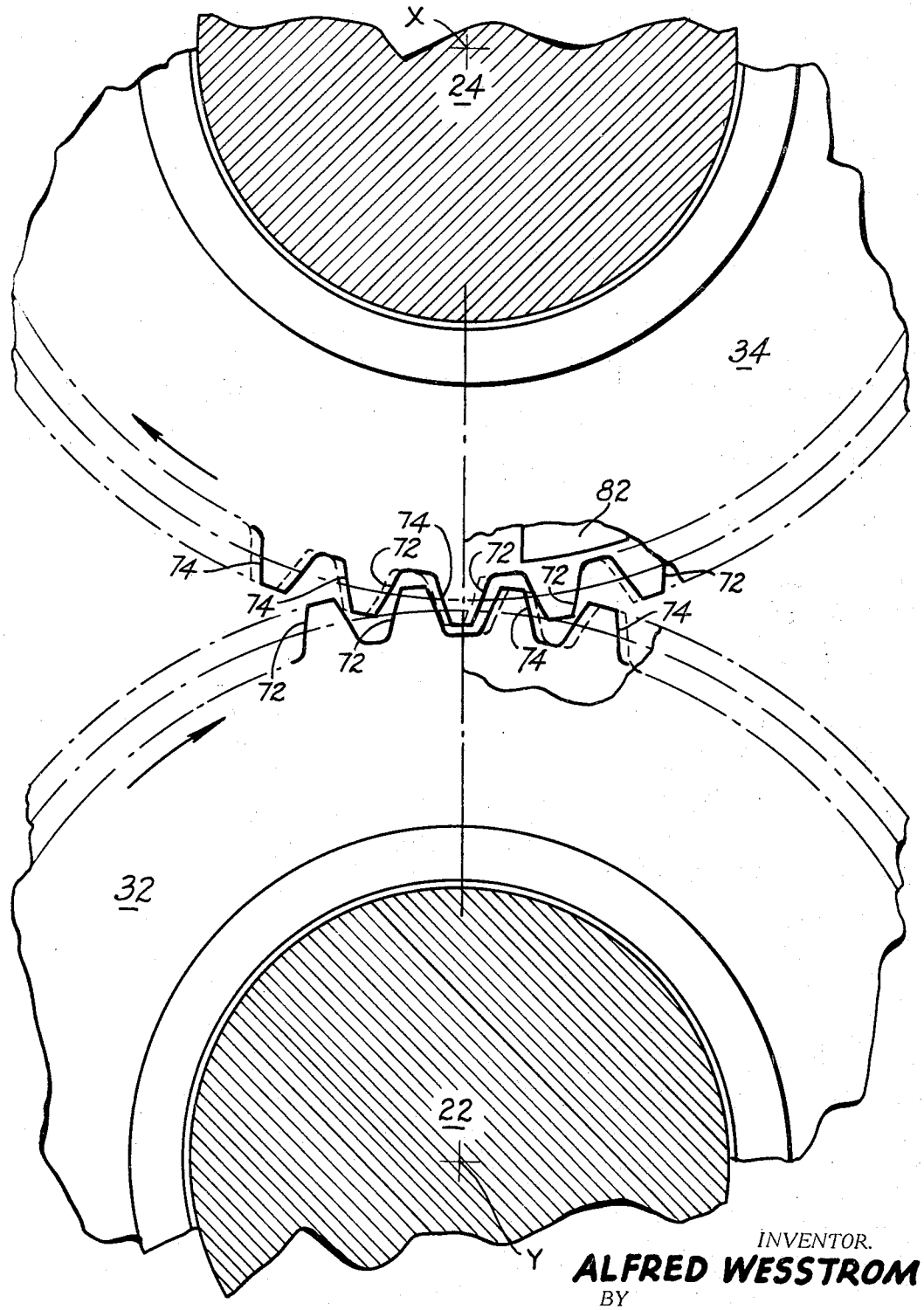

| United States Patent Office | 3,373,627 |
|---|---|
| | Patented Mar. 19, 1968 |

3,373,627
ADJUSTABLE SYNCHRONIZATION GEARS FOR SERPENTINE SLITTING MACHINE
Alfred Wesstrom, South Bend, Ind., assignor to The Bendix Corporation, a corporation of Delaware
Filed Jan. 27, 1966, Ser. No. 523,451
5 Claims. (Cl. 74—440)

ABSTRACT OF THE DISCLOSURE

Adjustable driving and driven mesh gears rotatable about parallel axes having a variable spaced relationship wherein each gear is provided with two part gear teeth and adjusting means connected thereto for adjusting one part relative to the other part to vary the circular thickness of the two part gear teeth. The adjustable one part of the driving and driven gear teeth are arranged in reverse relative arrangement to permit varying the circular thickness of the teeth of each gear by a desired amount to eliminate backlash or unwanted clearance between the teeth of each gear in both directions of rotation of the driving gear.

---

Various types of conventional machines are provided with two rotatable arbors upon which are mounted a pair of mating cutter members having coacting cutting edges between which a strip of material is passed and cut according to the pattern defined by the coacting cutting edges. In the case of mating cutting members having a cutting pattern defined by regular cutting edges as, for instance, a straight line cut, the relative positions of the two mating cutting members are of little concern since a given segment of the cutting edge of one cutting member does not have to mate exactly with any particular segment of the cutting edge of the mating cutting member to perform the desired cutting operation. However, when the cutting edges of the members are irregular, the relative rotational positions of the mating cutting members must be maintained in substantially absolute synchronization if the cutting edges are to mate properly as the cutting members rotate. Thus, in the case of cutting members having irregular cutting edges, it is essential that backlash or difference between tooth thickness of one spur gear and the tooth space of the mating gear be rigidly controlled to a minimum to prevent misalignment of the mating cutting edges and subsequent damage to the cutting members as well as improper cutting action of the cutting members.

Reference is made to copending U.S. patent application Ser. No. 490,190, filed Sept. 27, 1965, in the name of Alfred Wesstrom et al. (common assignee) for a showing and description of a pair of mating cutting members mounted on spaced apart driven and driving rotatable shafts on which the present adjustable gears are adapted to be mounted to maintain rotational synchronization therebetween.

It is an object of the present invention to provide an adjustable split gear wherein the circular thickness of the gear teeth may be varied.

It is another object of the present invention to provide a pair of mating gears having adjustable teeth whereby the circular thickness of the teeth may be increased to eliminate excessive clearance or backlash therebetween.

It is an important object of the present invention to provide a pair of adjustable gears for synchronizing rotational motion between two mating cutters having irregular cutting edges.

Other objects and advantages will become apparent from the following description and accompanying drawings, wherein:

FIGURE 1 is a schematic representation of a machine having two rotatable arbors carrying mating cutting members and a pair of synchronizing gears embodying the present invention for maintaining the cutting members in rotational alignment;

FIGURE 2 is a sectional view taken on line 2—2 of FIGURE 1 with a portion of the gears broken away to show the adjusting mechanism thereof;

FIGURE 3 is a sectional view taken on line 3—3 of FIGURE 2; and

FIGURE 4 is an enlarged view of a portion of FIGURE 2 wherein the center to center spacing of the mating gears is increased and the upper mating gear teeth to the right of a line between centers of the gears broken away to show the underlying lower mating gear teeth with the adjusted positions of the adjustable upper and lower gear teeth shown in dashed outline to illustrate the manner in which the backlash resulting from the increased center to center spacing of the gears is eliminated.

Referring to FIGURE 1, numeral 20 represents in general, a machine of conventional design which is suited to drive arbors 22 and 24 upon which cutting mechanism, generally indicated by 26, is mounted for rotation. The machine 20, being of conventional design, is therefore shown somewhat schematically and includes a motor 28 which, through a gear reduction unit 30, provides power for driving the arbor 22 which, in turn, drives arbor 24 through meshed synchronization gears 32 and 34 suitably secured to arbors 24 and 22, respectively, for rotation therewith.

A rotary cutter 36 is provided with a serpentine or sinuous cutting edge 38. An upper cutter 40 is defined by a pair of the rotary cutters 36 arranged back-to-back and suitably secured to arbor 22 for rotation therewith. One or more spacing members 42 interposed between the rotary cutters 36 serves to position cutters 36 in spaced relation on arbor 22, thereby establishing the effective width of cut of upper cutter 40. The upper cutter 40 is adapted to coact with a lower cutter 43 suitably secured to arbor 24 for rotation therewith. The lower cutter 43 is defined by a pair of rotary cutters 36 arranged in longitudinal spaced relationship on arbor 24 by means of one or more spacing members 44 so as to enable the serpentine cutting edges 38 thereof to properly coact with the cutting edges 38 of upper cutter 40, thereby shearing a sheet of metal passed therebetween into three strips 46, 48 and 50 from which circular blanks having a radius corresponding to the radius of curvature of the serpentine cutting edges of cutter 40 and 43 may be stamped as disclosed in more detail in said copending application Ser. No. 490,190.

The upper arbor 22 is vertically adjustable to vary the clearance between upper and lower cutting members 40 and 43 in accordance with the thickness of the metal to be cut as will be understood by those skilled in the art. The upper arbor 22 is adjusted vertically in its supports 52 and 54 by a rotatable handwheel 56 which drives a shaft 58 suitably connected by conventional motion transmitting mechanism, not shown, to the ends of arbor 22 so as to raise or lower arbor 22 without disturbing its parallel relationship with arbor 24.

It will be recognized that the diameters of a given pair of cutting members 40 and 43 is a function of the radius of curvature of the serpentine cutting edge formed thereon. Thus, in cutting operations where one set of cutting members 40 and 43 having a certain diameter may be replaced by one or more sets of cutting members of different diameters, depending upon the desired radius of curvature of the cut metal, it is necessary to adjust the spacing of arbors 22 and 24 to accommodate the larger or smaller cutting members, depending upon the relative change in diameters.

Also, a given set of cutting members 40 and 43 may be used to cut sheets of metal of different thicknesses in which case the spacing of the cutting members 40 and 43 must be adjusted to obtain the proper clearance between mating cutting edges, depending upon the thickness of the metal. Those persons skilled in the art of sheet metal cutting will recognize that the clearance between the cutting edges 38 of cutting members 40 and 43 normally is increased as the thickness of the sheet metal increases. The specific clearance required for cutting a given metal of certain thickness may be obtained from technical handbooks devoted to the subject of metal cutting and readily available to those persons interested.

Referring to FIGURES 2 and 3, in particular, the synchronizing gears 32 and 34 are shown as to mating spur gears on centers X and Y, respectively, each of which includes concentric annular sections 60 and 62 having axially extending hubs 64 and 66, respectively, and associated radially extending walls 68 and 70 integral therewith. The hub 66 is slidably carried on hub 64 and extends into engagement with wall 68, thereby establishing a spaced apart relationship between walls 68 and 70. Matching rows of gear teeth 72 and 74, having identical pitch circles, are formed in the radial outer portion of walls 68 and 70, respectively. The rows of gear teeth 72 and 74 are adapted to be axially aligned to thereby establish composite gear teeth having an over-all face width equal to the combined face widths of teeth 72 and 74, plus the axial clearance therebetween.

The hub 64 is keyed to its associated shaft 22 or 24 by a conventional key arrangement generally indicated by 76.

The hub 66 is machined on each of two diametrically opposed sides thereof to define right angle notches 78 and 80 separated by a rib 82 which is threaded to receive an adjustable bolt 84 having a rounded end and an opposite end provided with a socket or the like to provide for manual adjustment of bolt 84.

A notched portion 86 formed in the axial inner side of wall 68 adjacent each of the notches 78 is adapted to receive a bearing block 88 which is fixedly secured in position therein by a plurality of bolts 90 extending through block 88 into threaded engagement with wall 68. The block 88 occupies a spaced apart position relative to the adjacent wall of notch 78 and is provided with a depression 92 which receives the rounded end of bolt 84. With reference to FIGURE 2, it will be noted that each gear 32 and 34 may be adjusted by means of the two adjusting bolts 84 associated therewith. In the case of gear 32 as viewed in FIGURE 2, the upper bolt 84 screwed inward toward its associated block 88 and the lower bolt 84 screwed outward an equal amount from is block 88 tends to rotate hub 66 clockwise about hub 64 as viewed in FIGURE 2, thereby displacing teeth 74 arcuately relative to teeth 72 which results in a corresponding increase in circular thickness of the composite teeth of gear 32. Adjustment of the two bolts 84 of gear 32 in an opposite manner from that described above results in clockwise arcuate movement of teeth 74 relative to teeth 72 and corresponding similar change in circular thickness of the composite teeth of gear 32.

The gear 34, like gear 32, may be adjusted by suitable adjustment of the two bolts 84 associated therewith to modify the circular thickness of the composite gear teeth of gear 34. As shown in FIGURE 3, the gears 32 and 34 are in reverse relative positions whereby the teeth 74 of adjustable section 62 of one gear mate with teeth 72 of the nonadjustable section 60 of the other gear. As will be described later, the gears 32 and 34 are equally adjusted to eliminate undersired backlash between the gears 32 and 34.

The annular sections 60 and 62 are held together in operating relationship by spacing members 44 oppositely disposed thereto on shafts 22 and 24. The axial dimension of hub 64 is sufficiently greater than that of hub 66 to permit rotation of section 62 relative to section 60 by adjusting bolts 84 with the gears 32 and 34 mounted as shown between spacing members 44.

OPERATION

Referring to the serpentine cutters 40 and 43 of FIGURE 1, it will be understood that the radius of curvature of the serpentine cutting edges of cutters 40 and 43 is a fixed dimension in accordance with the desired radius of the circular blanks to be stamped from the strips 46, 48 and 50. In the event that a circular blank of different radius is desired, it will be recognized that the radius of curvature of the serpentine cutting edges of cutters 40 and 43 must conform to the desired blank which necessitates substitution of different cutters 40 and 43 having a corresponding larger or smaller circumferential measurement depending upon the relative departure in the radius of curvature of the serpentine cutting edges. Thus, any one set of a number of sets of cutters 40 and 43, each set having a different radius for cutters 40 and 43, may be installed on arbors 22 and 24, depending upon the particular run of circular blanks desired.

Also, it may be desired to stamp circular blanks of a particular radius from sheets of metal having different thicknesses in which case the same set of cutters 40 and 43 may be used but the clearance between the serpentine cutting edges of the upper and lower cutters 40 and 43 must be adjusted accordingly to permit proper penetration of the metal by the cutters 40 and 43 as will be recognized by those persons skilled in the art.

A metal sheet of certain thickness may require zero clearance or overlap of the cutting edges of cutters 40 and 43, positive clearance or overlap of the cutting edges as the metal thickness decreases and negative clearance or radial spaced apart relationship of cutters 40 and 43 whereby the cutting edges thereof do not overlap as the metal thickness increases. The clearance depends upon the characteristics of the metal or other material being cut.

Now, assuming a given set of cutters 40 and 43 with the serpentine cutting edges 38 thereof in proper alignment as well as a corresponding set of gears 32 and 34 are mounted on arbors 22 and 24 as shown in FIGURE 1, the necessary clearance between upper and lower cutters 40 and 43 for the thickness of metal to be cut is obtained by turning the handwheel 56 to thereby vertically position arbor 22 and thus upper cutter 40. Assuming further that the backlash between gears 32 and 34 is satisfactory, power may be applied to arbors 22 and 24 causing cutters 40 and 43 to rotate, thereby shearing the sheet metal passed therebetween into strips 46, 48 and 59.

If it is desired to cut sheet metal of greater thickness, for example, from the same set of cutters 40 and 43, the clearance between the cutters 40 and 43 must be increased accordingly by turning handwheel 56 to effect the necessary upward movement of arbor 22 relative to arbor 24 as, for example, distance $d$ in FIGURE 2, which movement also results in movement of gear 34 relative to gear 32 which, in turn, increases the clearance or backlash between the teeth of gears 32 and 34, accordingly, as indicated in FIGURE 4. As a result of the increased backlash, the alignment of cutters 40 and 43 connot be assured during subsequent rotation thereof. To eliminate the undesired clearance or backlash, the lower bolt 84 of gear 32 is backed away from associated block 88 and upper bolt 84 screwed inwardly toward associated block 88, thereby causing section 62 to rotate clockwise on hub 64 as viewed in FIGURE 2 whereupon teeth 74 move into engagement with teeth 72, which results in a corresponding increase in circular thickness of the composite gear teeth of gear 32 by an amount equivalent to one-half of the backlash to be eliminated. The section 62 is fixed in position relative to section 60 by screwing lower bolt 84 into engagement with associated block 88. The remaining backlash is eliminated by a similar adjustment of gear 34.

The lower bolt 84 of gear 34 as viewed in FIGURE 2 is backed away from associated block 88 and upper bolt 84 screwed inwardly toward associated block 88, thereby causing section 62 of gear 34 to rotate clockwise on hub 64 of gear 34 whereupon teeth 74 move into engagement with teeth 72 of gear 32 resulting in an increased circular thickness of the composite teeth of gear 34 by an amount equivalent to the above-mentioned remaining one-half of the backlash. As in the case of gear 32, the section 62 of gear 34 is subsequently fixed in position relative to section 60 by screwing lower bolt 84 into engagement with its associated block 88.

It will be noted that sections 60 of gears 32 and 34 are keyed to the respective shafts 22 and 24 which remain in fixed relative positions during the above described adjustments of gears 32 and 34 such that the relative position of upper and lower cutters 40 and 43 is not disturbed.

Preferably, each set of cutters 40 and 43 is provided with a matching set of gears 32 and 34. Assuming that the range of thicknesses of sheet metal to be cut by a given set of cutters 40 and 43 is known, the matching set of gears 32 and 34 is designed to have a maximum working depth of the teeth thereof for a maximum overlap of the cutting edges of cutters 40 and 43 which corresponds to the thinnest sheet metal to be cut. Thus, the gear teeth 72 and 74 of each gear 32 and 34 are axially aligned and have a minimum circular thickness when at their maximum working depth as shown in FIGURES 2 and 3. As the thickness of metal to be cut increases, the overlap of cutters 40 and 43 is decreased by adjustment of the arbor 22 which requires a corresponding adjustment of gears 32 and 34 to increase the circular thickness of the teeth thereof to compensate for the increased backlash in the above-mentioned manner.

The gear teeth 72 and 74 may conform to conventional gear teeth design as, for example, standard 14° pressure angle teeth which have been found to be well suited for use in applicant's adjustable gear mechanism.

Various changes and modifications in the structure shown and described may be made by those persons skilled in the art without departing from the scope of applicant's invention as defined by the following claims.

I claim:
1. Adjustable gearing for synchronizing motion of two rotatable members having parallel axes of rotation adapted to be variably spaced, said gearing comprising:
   a first gear operatively connected to one of the two rotatable members and rotatable therewith on its associated axis of rotation;
   a second gear operatively connected to the other of the two rotatable members and rotatable therewith on its associated axis of rotation;
   said first and second gears each including first and second annular portions concentrically arranged and provided with first and second rows, respectively, of circumferentially spaced apart gear teeth, which together define two part gear teeth;
   said first and second gears being operatively connected with the two part gear teeth of the first gear in mesh with the two part gear teeth of the second gear; and
   adjustable means operatively connecting said first and second annular portions of each of said first and second gears for rotating said first annular portion relative to said second annular portion and thus the position of said first row of teeth relative to said second row of teeth to thereby vary the circular thickness of said two part gear teeth and eliminate undesired backlash between said meshed first and second gears.

2. Adjustable gearing as claimed in claim 1 wherein:
   said second annular portion is fixed in position relative to its associated rotatable member and provided with an axially extending hub;
   said first annular portion is carried on said axially extending hub and rotatably adjustable thereon relative to said second annular portion.

3. Adjustable gearing as claimed in claim 2 wherein said adjustable means includes:
   a pair of spaced apart bearing members fixedly secured to said second annular portion;
   a pair of spaced apart screw members threadedly engaged with said first annular portion and engageable with said pair of spaced apart bearing members to lock said first annular portion in position relative to said second annular portion;
   said first annular portion being positioned relative to said second annular portion by screwing one of said screw members in toward its associated bearing member and screwing the other of said screw members outward away from its associated bearing member.

4. Adjustable gearing as claimed in claim 1 wherein:
   said first annular portion of each of said first and second gears is adjusted relative to its associated second annular portion to vary the circular thickness of the two part gear teeth of said first and second gears an equal amount thereby eliminating undesired backlash without changing the relative rotational positions of said first and second gears.

5. Adjustable gearing as claimed in claim 1 wherein the two rotatable members are mating cutter members having irregular cutting edges adapted to cut sheet metal of varying thicknesses and:
   said first gear and associated cutting member are secured in fixed relative positions on a rotatably mounted first shaft adapted to be driven by motor means;
   said second gear and associated cutting member are secured in fixed relative positions on a rotatably mounted second shaft adapted to be driven in synchronization with said first shaft by said first and second gears;
   said first shaft being adjustable relative to said second shaft to increase the spacing between the cutting edges of the two rotatable cutting members in accordance with increased thickness of sheet metal to be cut;
   said first and second gears being adjustable to increase the circular thickness of each of the two part gear teeth associated therewith to compensate for the increased backlash between said first and second gears created by the adjustment of said first shaft relative to said second shaft.

References Cited

UNITED STATES PATENTS

| | | | |
|---|---|---|---|
| 851,180 | 4/1907 | Mathewson | 74—395 |
| 2,596,997 | 5/1952 | Harter | 74—395 X |
| 3,037,396 | 6/1962 | Martin | 74—440 X |
| 3,302,558 | 2/1967 | Otto | 74—440 X |

FOREIGN PATENTS 25,935    5/1908    Great Britain.

ROBERT M. WALKER, *Primary Examiner.*

DONLEY J. STOCKING, *Examiner.*

L. H. GERIN, *Assistant Examiner.*